US010209052B1

(12) United States Patent
Keen et al.

(10) Patent No.: US 10,209,052 B1
(45) Date of Patent: Feb. 19, 2019

(54) CAKE CONSTRUCTION TOOL (71) Applicants: Adrianne Keen, Louisville, KY (US); Lukus Holt Guhy, Louisville, KY (US); Drew Edward Miller, Independence, KY (US); Greg Hickerson, Louisville, KY (US); Nicholas David Courtwright, Louisville, KY (US); David A. Ward, Lexington, KY (US)

(72) Inventors: Adrianne Keen, Louisville, KY (US); Lukus Holt Guhy, Louisville, KY (US); Drew Edward Miller, Independence, KY (US); Greg Hickerson, Louisville, KY (US); Nicholas David Courtwright, Louisville, KY (US); David A. Ward, Lexington, KY (US)

( * ) Notice: Subject to any disclaimer, the term of this patent is extended or adjusted under 35 U.S.C. 154(b) by 160 days.

(21) Appl. No.: 15/280,952

(22) Filed: Sep. 29, 2016

Related U.S. Application Data (63) Continuation-in-part of application No. 14/871,284, filed on Sep. 30, 2015, now Pat. No. 9,851,195.

(51) Int. Cl.
G01B 5/25 (2006.01)
A23G 3/28 (2006.01)
A21C 15/00 (2006.01)

(52) U.S. Cl.
CPC ............... *G01B 5/25* (2013.01); *A21C 15/00* (2013.01); *A23G 3/28* (2013.01)

(58) Field of Classification Search
CPC . A21C 15/00; A23G 3/28; G01B 3/14; G01B 5/08; G01B 5/25; G01B 5/252; G01B 21/10
USPC ... 33/1 F, 1 AP, 1 BB, 501, 524, 525, 561.1, 33/561.2, 561.3; 99/428, 432, 433
See application file for complete search history.

(56) References Cited

U.S. PATENT DOCUMENTS

| 583,695 A | * | 6/1897 | Stalons et al. | B26D 3/245 33/525 |
| 681,551 A | * | 8/1901 | Hulse et al. | B26D 3/245 33/1 F |
| 1,519,752 A | * | 12/1924 | Bannister | A21C 14/00 30/114 |
| 1,797,070 A | * | 3/1931 | Brown | A21C 14/00 30/114 |

(Continued)

FOREIGN PATENT DOCUMENTS

| GB | 198245 A | * | 5/1923 | ............... A23G 3/28 |
| JP | 09126701 A | * | 5/1997 | ............... G01B 3/02 |

*Primary Examiner* — R. A. Smith
(74) *Attorney, Agent, or Firm* — Middleton Reutlinger (57) ABSTRACT

Apparatus and tools for constructing cakes are described herein. In various embodiments, an apparatus for use in cake construction may include a frame. In various embodiments, the frame may include a first end, a second end, a top, and a bottom. In various embodiments, a vertical post may pass through the top and the bottom. At least one arm may be rotatably connected to the post, such that the at least one arm is rotatable circularly about a longitudinal axis of the post. In various embodiments, the post may be positionable at a center of a circle coincident with a circular cake such that the at least one arm is rotatable about the post to demarcate a circumference of the circle.

20 Claims, 8 Drawing Sheets

(56) References Cited

U.S. PATENT DOCUMENTS

| | | | | |
|---|---|---|---|---|
| 2,614,328 A | * | 10/1952 | Urshan | A47G 19/022 30/114 |
| 3,130,764 A | * | 4/1964 | Donovan | B26D 3/245 33/482 |
| 3,318,283 A | | 5/1967 | MaClam et al. | |
| 3,380,169 A | * | 4/1968 | Ungar et al. | A47G 19/022 33/525 |
| 3,477,135 A | * | 11/1969 | Haapala | A23G 3/28 33/525 |
| 3,545,088 A | * | 12/1970 | Johnson | G01B 5/0004 33/501 |
| 3,690,610 A | | 9/1972 | Peirce | |
| 3,693,261 A | * | 9/1972 | Moore | B43L 7/12 33/1 AP |
| 4,069,772 A | | 1/1978 | Haapala | |
| 4,676,005 A | | 6/1987 | Seligman | |
| 5,065,518 A | * | 11/1991 | Herrera | A21C 15/00 33/1 BB |
| 7,287,870 B1 | | 10/2007 | Knoch | |

\* cited by examiner

CAKE CONSTRUCTION TOOL

CROSS-REFERENCE TO RELATED DOCUMENTS

This Application is a continuation-in-part of currently pending application Ser. No. 14/871,284 filed Sep. 30, 2015 and entitled "A Cake Construction Tool", which is hereby incorporated by reference in its entirety.

BACKGROUND

In a multi-tiered cake, each tier is typically smaller in diameter than the tier, or layer of cake, underneath. For example, a three-tiered cake may have a base tier that is twelve inches in diameter, a second, or middle, tier that is nine inches in diameter, and a third, or top, tier that is five inches in diameter. Therefore, the construction of such a multi-tiered cake typically requires the use of rods or posts to support each tier or layer. Such support is typically required in order to prevent the tiers from moving or shifting relative to each other and to aid in supporting the weight of the tiers. Further, it is desirable to have each tier centrally aligned and also desirable to have the supports radially spaced the same distance from the center of the tier such supports will secure. Some bakers guess at, or "eyeball," the placement of the supports for multi-tiered cakes. Others utilize a measuring device such as a ruler. However, these techniques may be imprecise, which may lead to multi-tier cakes that are not properly aligned. Depending on the severity of the misalignment, a multi-tiered cake may even become unstable.

Therefore, it may be desirable to provide a cake construction tool that aids in the placement of supports for multi-tiered cakes wherein such tiers have different diameters. Additionally or alternatively, it may be desirable to provide a cake construction tool that aids in centering tiers having different diameters of a multi-tiered cake. Additionally or alternatively, it may be desirable to have a cake construction tool that includes measurement indicia. Additionally or alternatively, it may be desirable for the cake construction tool to be collapsible for convenient storage.

SUMMARY

Accordingly, embodiments are related to a tool employed by bakers in assembling multi-tiered cakes. More specifically, present embodiments are related to a tool having one or more rotatable arms with openings at various distances to mark the locations for support rods for cake tiers having different diameters and to aid in the centering of the multiple tiers of cake. The arms of such tool may be collapsible or stackable into a main cavity of the tool for storage purposes.

In one embodiment a tool for use in cake construction includes a frame that includes a first end, a second end, a top, and a bottom, wherein a vertical post passes through the top and the bottom; at least one arm rotatably connected to the post, wherein the arm(s) may be rotatable circularly about a longitudinal axis of the post; wherein the post may be positionable at a center of a circle that is coincident with a circular cake such that the arm(s) may be rotatable about the post to demarcate a circumference of the circle.

In another embodiment the vertical post passes through the top and the bottom at a center of the frame between the first and second ends.

In still another embodiment the arm(s) may be rotatable about the post to represent a diameter of the circle. In other embodiments the vertical post passes through the top and the bottom at the second end.

In another embodiment the arm(s) may be rotatable about the post to represent a radius of the circle. In still another embodiment, the arms may be arranged in a vertical stack.

In other embodiments a first arm includes a top and a bottom, the bottom also includes a front protruding lip and a tab protruding from the front protruding lip to engage a neighboring arm of the vertical stack. In another embodiment the neighboring arm also includes a top and a bottom, the top of the neighboring arm also includes a recessed groove to engage the tab protruding from the front protruding lip of the first arm. In still another embodiment the top of the first arm includes another protruding tab to engage a rear protruding lip of the neighboring arm.

In another embodiment, arm(s) include at least one hole though the arm(s) as a size indicia for use in demarcating a circumference of the circle.

In another embodiment, an apparatus for use in cake construction contains a post that includes a handle, a base, and at least one arm rotatably connected to the post, where the arm(s) are rotatable circularly about a longitudinal axis of the post. Additionally, the post is positionable at a center of a circle that is coincident with a circular cake such that the at least one arm is rotatable about the post to demarcate a circumference of the circle.

In some embodiments, the arm(s) have a wedge shape, with a point of the wedge proximate the post and a wider edge of the at least arm distal the post.

In some embodiments the post includes a dial that operably rotates the arm(s) about the post. In other embodiments, the dial is contained in a cover, where the cover envelops the post, attaching to a first end of the post and to the base.

In another embodiment, a cake construction tool comprises a post, a base, and at least one arm, where the at least one arm is rotatably connected to said post and where the at least one arm is rotatable relative to the post to demarcate a diameter of a circle for marking a cake.

In some embodiments the at least one arm includes a plurality of arms; in some embodiments four arms.

In some embodiments the cake construction tool further contains a top that covers the post, attaching to the base and to a first end of the post, and the top also has a dial.

In some embodiments the dial is turned to rotate the arm(s) about the post. In other embodiments, the dial also has a plurality of indentations for gripping. In still other embodiments, the arm(s) have a hook for storage.

In another embodiment, an apparatus for use in cake construction contains: a post that has a dial and a base, where the post vertically connects the dial and the base; a plurality of individual arms rotatably connected to the post, where the plurality of arms are arranged in a vertical stack whereby the arms are rotatable around the post. In this embodiment, a first individual arm of the plurality of individual arms has a top and a bottom, the bottom further containing a protruding lip to engage a neighboring individual arm of the stack and a tab protruding from the lip. The remaining individual arms of the plurality of individual arms each contain a top and a bottom, the top further containing a recessed groove to engage a tab protruding from a lip of a neighboring arm of the stack and a protruding tab shaped to engage a lip of a neighboring arm of the stack, the bottom further containing a protruding lip capable of engaging a neighboring arm and a tab protruding from the lip. The post and plurality of individual arms of this embodiment are capable of demarcating a diameter of a circle.

BRIEF DESCRIPTION OF THE DRAWINGS

In order that the embodiments may be better understood, embodiments of the cake construction tool will now be described by way of examples. These embodiments are not to limit the scope of the claims as other embodiments of the cake construction tool will become apparent to one having ordinary skill in the art upon reading the instant description. Non-limiting examples of the present embodiments are shown in figures wherein:

DETAILED DESCRIPTION

It is to be understood that the cake construction tools and apparatus described herein are not limited in their application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1 through 5 various views of an embodiment of a cake construction tool 10. Such a tool 10 may be used to aid in the placement of supports for, and the centering of, tiers or layers of a multi-tiered cake (depicted in FIGS. 4-5).

Figure 1:
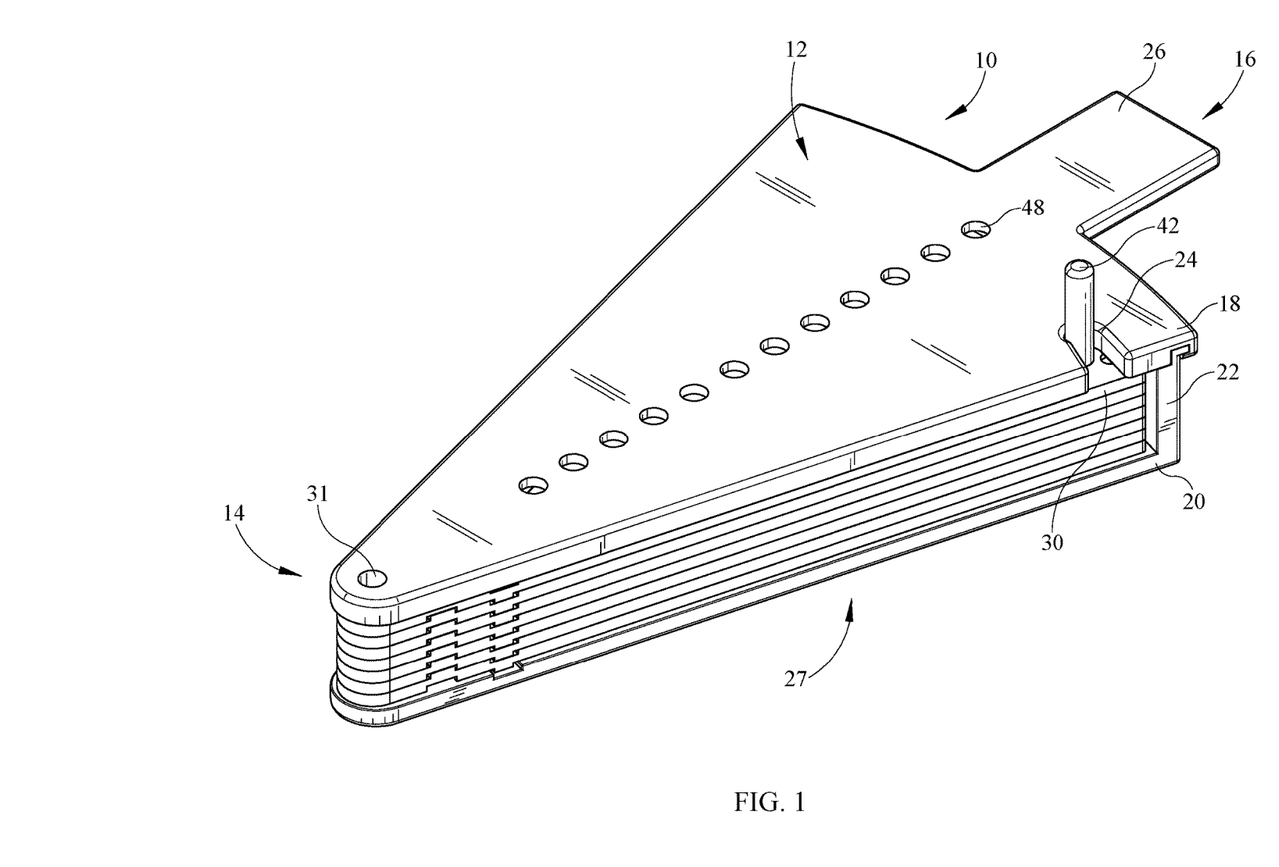
FIG. 1 is a perspective view of one embodiment of a cake construction tool in its fully collapsed state.

Referring initially to FIG. 1, a perspective view of one embodiment of a cake construction tool 10 is shown closed. The tool 10 includes generally a triangular or wedge-shaped frame 12 having a first end 14 and a second end 16. While the measured length between the two ends may be any length, the particular embodiment depicted is approximately eight and a half inches (8.5") long. In the embodiment of FIGS. 1-5, frame 12 of tool 10 has a top 18 and a separate bottom 20 that is spaced from top 18. However, this is not meant to be limiting, and in other embodiments, frame 12 may include a single component with two opposing surfaces, one considered the top and the other considered the bottom. Additionally, the terms "top" and "bottom" are merely used herein to describe the two surfaces, but such designations could be reversed.

In some embodiments, an additional side 22 may connect top 18 and bottom 20. In some embodiments, the top 18 also includes a cutout with a stop or edge 24. In still yet other embodiments the tool 10 also includes a handle 26 for ease of use. Additionally, frame 12 may include an opening 27 leading to a cavity 28 in frame 12 that is generally bound by top 18, bottom 20, ends 14, 16, and, where present, side 22. At least one arm 30, described in detail below, may be stored with cavity 28 of frame 12. In some embodiments, tool 10 may have only one arm 30. In other embodiments, tool 10 may have a plurality of arms 30. While there are seven arms 30a-g depicted in FIGS. 1-5, this should be understood as not limiting the scope of the invention.

Figure 2:
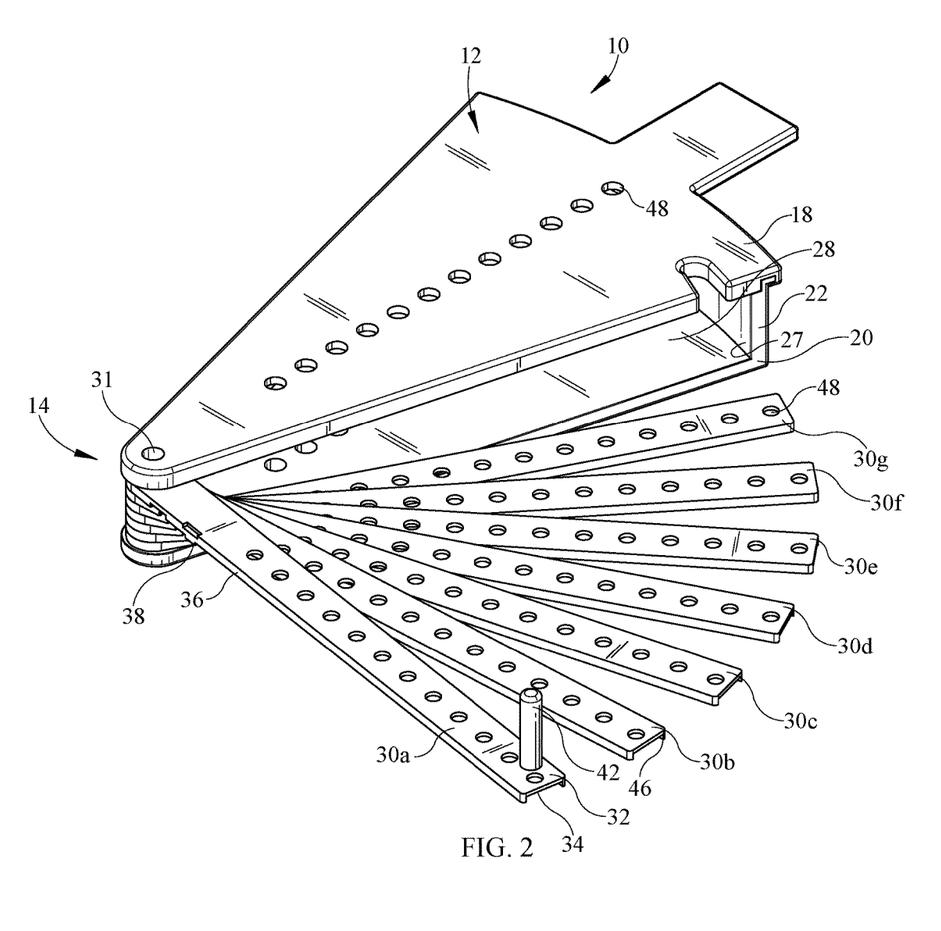
FIG. 2 is a perspective view of the cake construction tool of FIG. 1 partially opened.
Figure 3:
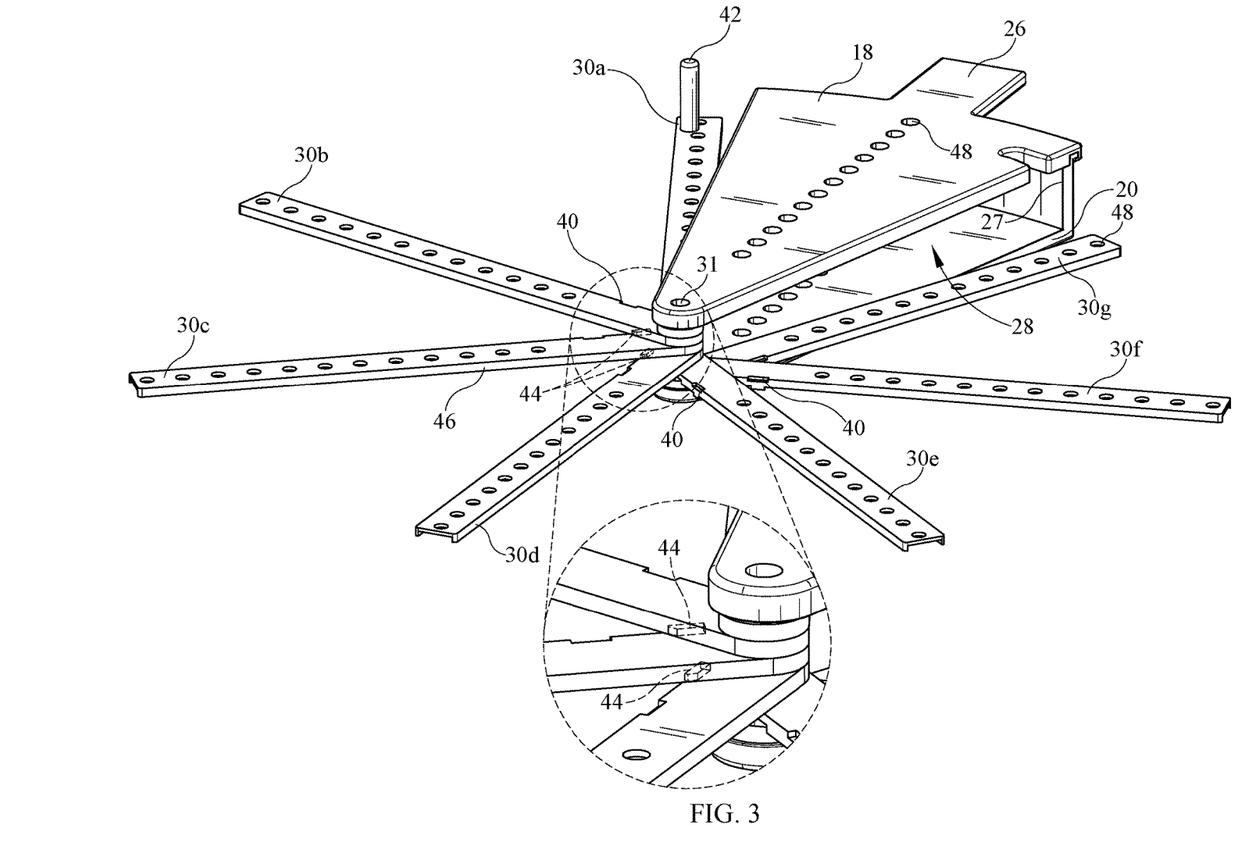
FIG. 3 is a perspective view of the cake construction tool of FIG. 1 fully opened.

Referring to FIG. 2, a perspective view of one embodiment of a cake construction tool 10 is shown partially open. Arms 30a-g are rotatably connected to a vertical post 31 upon which they may circularly rotate about a longitudinal axis of the post 31. Post 31 passes through and connects top 18 and bottom 20 of frame 12. In some embodiments, arms 30a-g may be stacked vertically on post 31 as shown in FIGS. 1-5. This allows a user to position post 31 at a center of a circular cake and fan the arms 30 outward, as shown in FIGS. 2 and 3, in order to demarcate the circumference of the circle. In the embodiment depicted in FIGS. 1-5, post 31 passes through top 18 and bottom 20 of frame 20 at first end 14 of frame 12, such that each arm 30 is rotatable about post 31 to represent a radius of a circle. However, this is not meant to be limiting. In other embodiments, post 31 may pass through top 18 and bottom 20 at a center of frame 12 between the first and second ends 14 and 16. Post 31 may likewise pass through a center of arms 30, rather than one side as depicted in FIGS. 1-5. In such embodiments, each arm 30 may be rotatable about post 31 to represent a diameter of a circle.

Each arm 30 may have a top 32 and a bottom 34 surface. The top arm 30a of the vertical stack may have a front protruding lip 36 and a tab 38 protruding from the protruding front lip 36. Other arms 30, such as a neighboring arm 30b, may have a recessed groove 40 (See FIG. 3) on the top 32. Recessed groove 40 of one arm (e.g., 30b) may be engaged by tab 38 protruding from front lip 36 of a neighboring arm (e.g., 30a). When arms 30 are fully collapsed such that they are stacked within the cavity 28, as shown in FIG. 1, the bottom tab 38 of each arm 30 fits within the recessed groove 40 of a neighboring arm 30. In the depicted embodiment, a tab 38 of a first arm (e.g., 30a) engages a recess 40 of a neighboring arm (e.g., 30b) that lies below the first arm in the vertical stack. However, this is not meant to be limiting. For example, in other embodiments, tabs 38 and recessed grooves 40 may be reversed. Any combination of tabs 38 and recessed grooves 40, and placement thereof, may be used to engage neighboring arms 30 of the invention.

In some embodiments, the first arm 30a may include a vertically extending handle or peg 42. When arms 30a-g are in a fully closed position, contained within cavity 28 as depicted in FIG. 1, peg 42 extends through the cutout defined by edge 24 in top 18. Peg 42 may be moved outward from the cavity 28 in a circular motion around post 31. As first arm 30a rotates around post 31, an upward-protruding tab 44 on top 32 of a neighboring arm 30b (see the callout of FIG. 3) engages the rear lip 46 of the first arm 30a, which then causes arm 30b to also rotate around post 31. As arm 30b rotates around post 31, another upwardly-protruding tab 44 on top 32 of a neighboring arm 30c (see callout in FIG. 3) engages the rear lip 46 neighboring arm 30b, which then causes arm 30c to also rotate around post 31. This sequence continues as top arm 30a continues to rotate with each subsequent arm 30 being rotated by the arm above it. When top arm 30a is rotated until it stops against the frame 12, each of arms 30a-g has been rotated as generally described above to their fully rotated or desired locations as shown in FIG. 3. When at their fully rotated or open position, as shown in FIG. 3, arms 30 may equidistant apart from each other, although this is not required.

To close or retract the arms 30, the first arm 30a is rotated from its fully rotated position away from the frame 12, the tab 38 protruding from the front lip 36 of the arm 30a engages the recessed groove 40 of the neighboring arm 30b which then causes arm 30b to also rotate around post 31 toward the cavity 28 of the frame 12. As arm 30b rotates around post 31 toward the cavity 28 of the frame 12, the tab 38 protruding from the front lip 36 of arm 30b engages the recessed groove 40 of arm 30c, which then causes arm 30c to also rotate around post 31 toward the cavity 28 of the frame 12. This sequence continues with each subsequent arm 30 being rotated by its neighboring arm. When the first arm 30a is rotated back to its retracted position such that peg 42 is in the cutout defined by edge 24 of frame 12, arms 30a-g are stacked or fully retracted within cavity 28. This retracted position is useful for storing tool 10.

In various embodiments, tool 10 may include some size or measurement indicia. In some embodiments, these size indicia may include at least one hole, and preferably a series of holes 48 or apertures, through top 18 and bottom 20 of the frame 12 and arms 30. In the particular embodiment shown in FIGS. 1-5, top 18 and bottom 20 of frame 12 and arms 30 each have twelve holes. However, any number of desirable holes can be used. In other embodiments, the size or measurement indicia may be a series of lines or other markings on the frame or arms. The size or measurement indicia allow for the user to demarcate the desired located for the next layer of a tiered cake and, if desired, place rods, posts, or supports in the lower layers accordingly.

Figure 4:
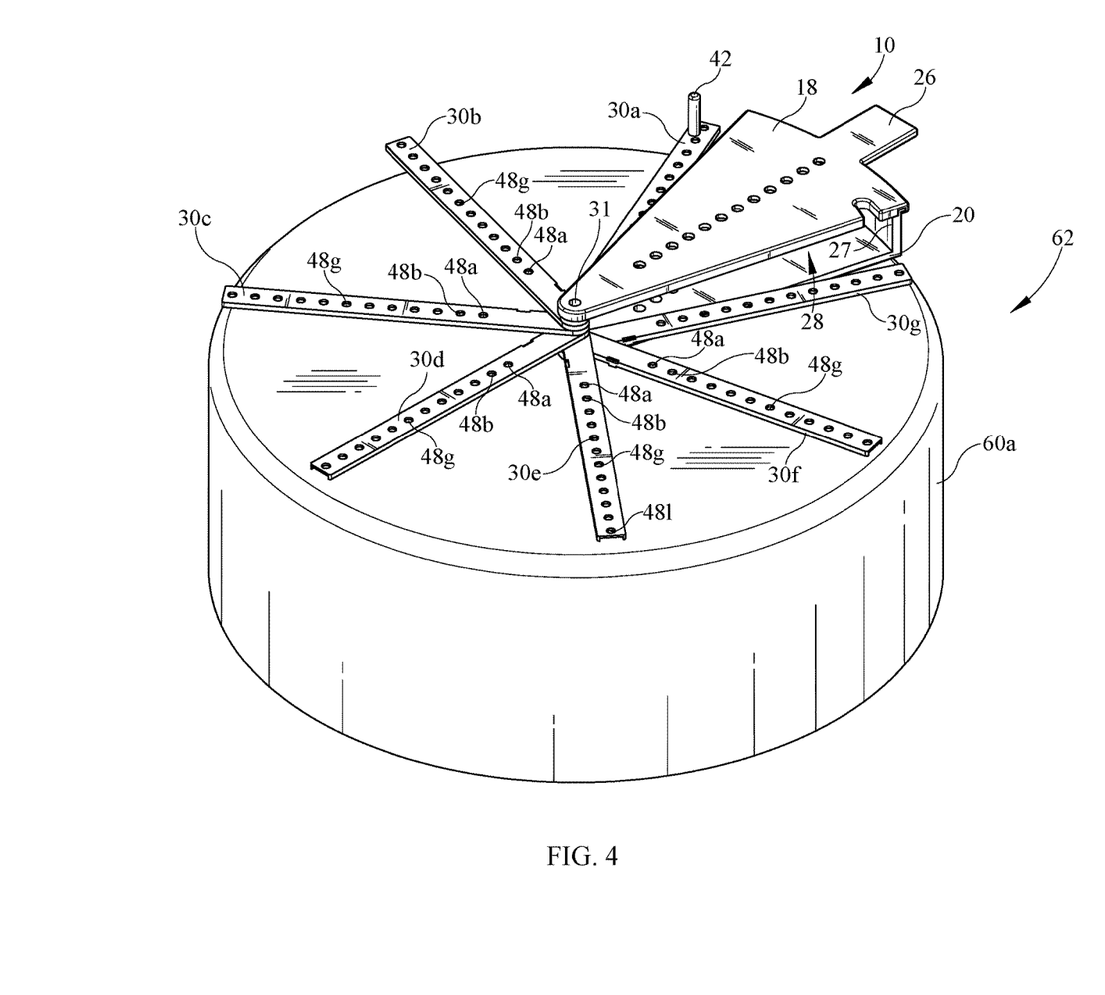
FIG. 4 is a perspective view of the cake construction tool of FIG. 1 being used on a bottom layer of a multi-tiered cake.

FIG. 4 depicts a perspective view of tool 10 positioned on a bottom layer 60a of a cake 62, such that the holes 48 demarcate different diameters of circles coincident with the cake. For example, when arms 30 are in their fully rotated or open position, the first set of holes 48a (closest to the post 31) may indicate a circle that is four inches in diameter. In this particular embodiment, each set of holes (as they move away from the post 31) indicate or represent a circle that is one inch greater in diameter. For example, holes 48b represent or indicate a circle that is five inches in diameter. Additionally, the arms 30 and top 18 of frame 12 may also include fiducial indicators, text, color, or other markings or indicia to indicate the different diameters. For example, top 18 of frame 12 may indicate that the first set of holes 48a represent a circle four inches in diameter by use of the text (i.e., 4") and/or a color code. Of course, this is not meant to be limiting, and in other embodiments, holes 48 may be used to demarcate circles having other diameters, using various measurements (e.g., inches, centimeters, etc.).

As a non-limiting example of use, a baker may need to mount an intermediate layer 60b (see FIG. 5) of cake 62 that is ten inches in diameter on a bottom layer 60a of cake 62 that is fifteen inches in diameter. Using tool 10 in its fully open position as depicted in FIG. 4, the baker can place tool 10 on the bottom layer 60a of cake 62 such that holes 48 of arms 30a-g (collectively demarcating a circle fifteen inches in diameter) are aligned with the edges of the bottom layer 60a. Once aligned, the baker can mark the bottom layer 60a of cake 62 through holes 48g (demarcating a circle ten inches in diameter). The baker can then remove tool 10 and centrally align the intermediate layer 60b of cake 62 on the bottom layer 60a using the markings which represent a circle ten inches in diameter. Further, the baker can then use tool 10 to mark the intermediate layer 60b of cake 62 for insertion of rods or supports to secure together the top and bottom layers of cake 62.

Figure 5:
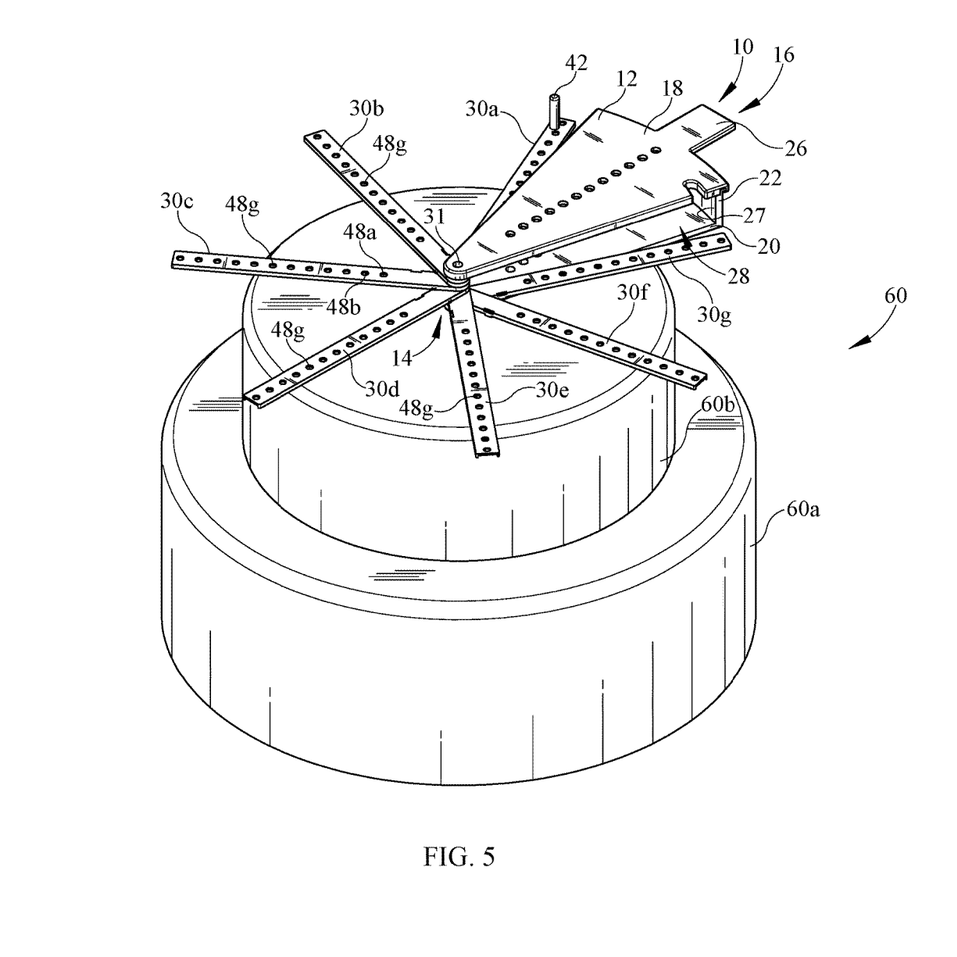
FIG. 5 is a perspective view of the cake construction tool of FIG. 1 being used on higher layer of the multi-tiered cake of FIG. 4.

For example, using tool 10 in its fully open position, the baker can place tool 10 on the intermediate layer 60b of cake 62 as depicted in FIG. 5 such that holes 48g (demarcating a circle ten inches in diameter) are approximately aligned with the edges of the intermediate layer 60b. Once aligned, the baker can mark on the intermediate layer 60b the desired placement of a higher layer of cake (not depicted) through the desired holes, for example holes 48e (demarcating a circle eight inches in diameter), for placement of the support rods. The baker can then remove tool 10 and place rods through the two layers of cake at the points marked on the top layer. In this example, the rods would be placed equidistant from the center of the cake and two inches from the edge of the top layer. Further, the baker can then rotate the arms 30 of tool 10 so that they are fully retracted and stacked in cavity 28 for storage purposes.

Figure 6:
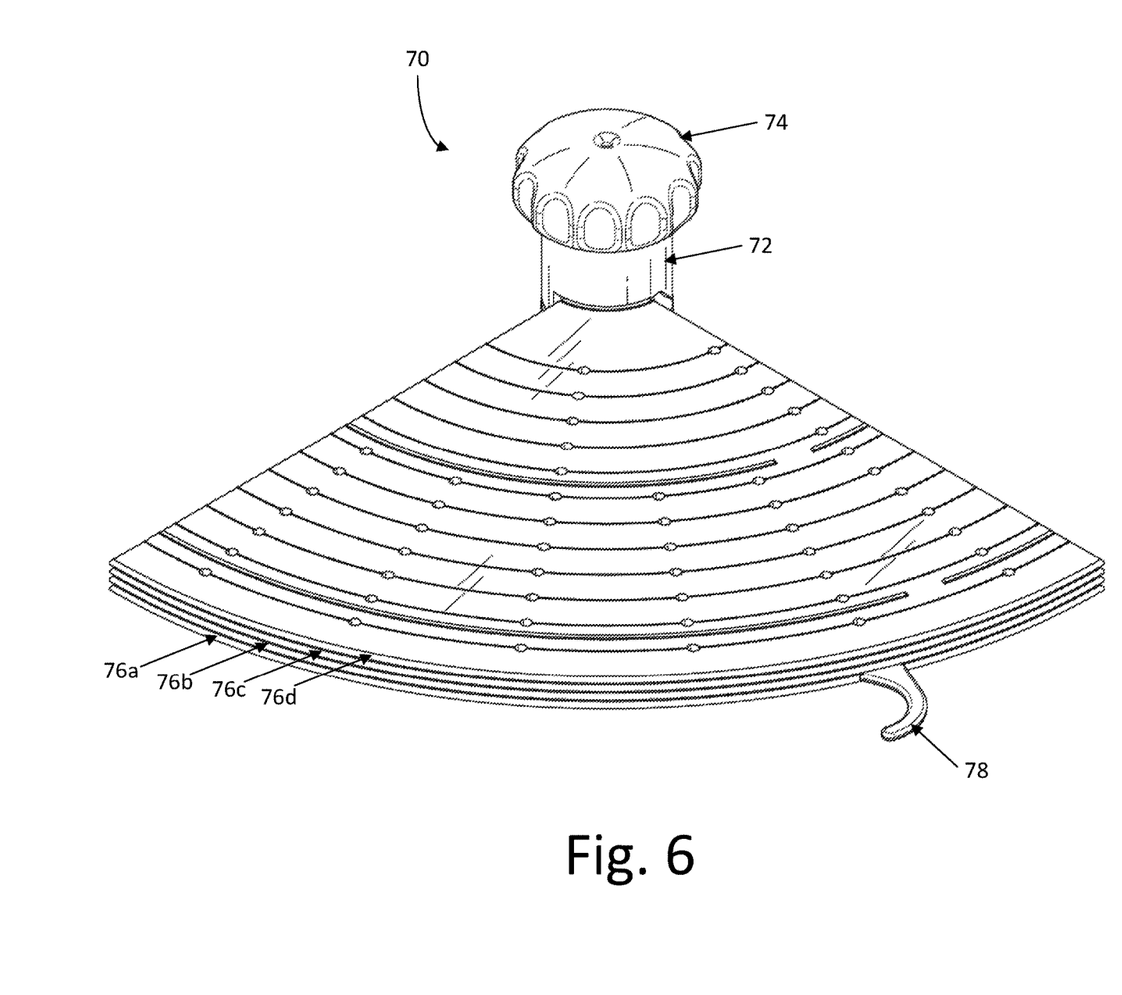
FIG. 6 is a perspective view of one embodiment of a cake construction tool in its fully collapsed state.

Now referring to FIG. 6, a perspective view of another embodiment of a cake construction tool 70 is shown closed. The tool 70 has a generally triangular or wedge-shape when closed. The tool 70 contains a vertical post 72, dial 74 (or "handle"), and wedge-shaped arms 76a-d that are rotatably connected to the vertical post 72 upon which they may circularly rotate about a longitudinal axis of the post 72. In some embodiments, each arm 76 may have a wedge shape, with a point of the wedge proximate the vertical post 72 and a wider edge of the wedge-shaped arm 76 distal the vertical post 72. In some embodiments the post 72 includes a base that may extend beyond a bottom surface of arms 76. However, in other embodiments, the base may be flush with the bottom of the arms 76, such that the bottom surface of the tool 70 may sit flat on a surface, such as a cake.

Figure 7:
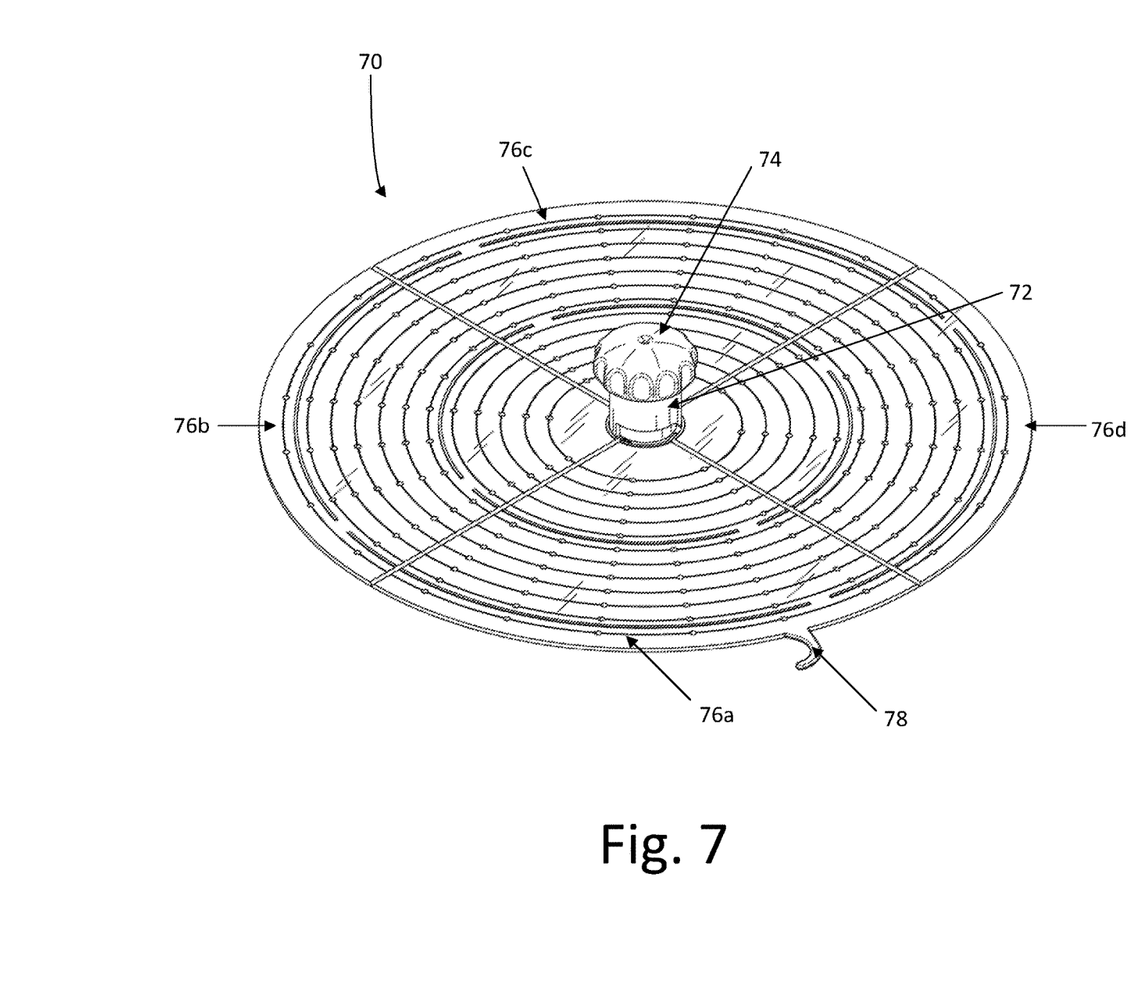
FIG. 7 is a perspective view of the cake construction tool of FIG. 6 in its fully open state.
Figure 8:
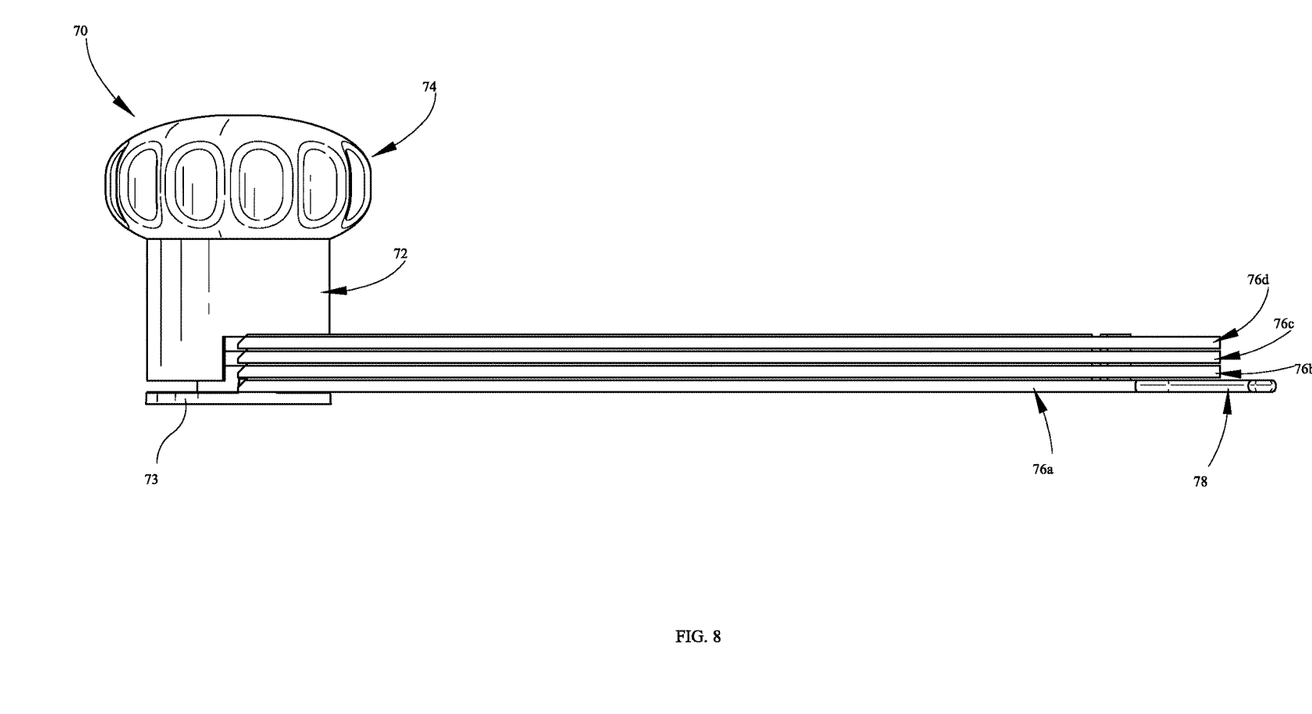
FIG. 8 is a side view of the cake construction tool of FIG. 6.

In some embodiments, arms 76a-d may be stacked vertically on the post 72, as shown in FIGS. 6-8. This allows a user to position post 72 at a center of a circular cake and fan the arms 76 outward, as shown in FIG. 7, allowing a user to demarcate the circumference/radius of the circle. FIG. 6-8 illustrate four arms 76, but it should be understood it is not so limited. Some embodiments may have as few as one arm, while other embodiments may have as many as is beneficial. In some embodiments, at least one arm 76a further includes a hook 78 positioned at an edge opposite post 72. This hook 78 may be used to hang or store the tool 70 when not in use, and/or to transition the tool between the closed configuration depicted in FIGS. 6 and 8 to the open configuration depicted in FIG. 7.

The dial 74 may be turned by a user in order to engage the arms 76 and cause the arms to rotate circularly about the longitudinal axis of the post 72. In some embodiments the dial 74 itself may be incorporated into the post 72, for example being positioned at the top of the post (as depicted in FIG. 6-8). In other embodiments the dial 74 may be incorporated into a cover that goes over the post 72 and attaches to a base 73. In some embodiments, the dial 74 may further include a series of indentions in order to enhance a user's group of the dial 74. In other embodiments there may not be a separate dial, but rather the post 72 itself functions as the dial. In such embodiments, a user would turn the post 72 in order to rotate the arms 76.

Each arm 76 may have a top surface (visible in FIGS. 6 and 7) and a bottom surface (not visible in FIG. 6-7). The top arm 76d of the vertical stack may have a front protruding lip and a tab protruding from the protruding front lip. Other arms 76, such as a neighboring arm 76c, may have a recessed groove (for example see the arms of FIG. 3) on the top. Recessed grove of one arm (e.g., 76c) may be engaged by the tab protruding from the front lip of a neighboring arm (e.g., 76d). When arms 76 are fully collapsed, as shown in FIG. 6, the bottom tab of each arm fits within the recessed grove of a neighboring arm 66. In some embodiments, a tab of a first arm (e.g., 76a) engages a recess of a neighboring arm (e.g., 76c) that lies below the first arm in the vertical stack. However, this is not meant to be limiting. For example, in other embodiments, tabs and recessed groves may be reversed. Any combination of tabs and recessed groves, and placement thereof, may be used to engage neighboring arms of the tool 70.

Alternatively, a ramp feature on the dial may work together with the tabs in order to position each arm vertically. Once an arm reaches the limit of its radial travel, and thus is constrained from continued radial movement by the tab and adjacent groove, the ramp feature on the dial may force the arm downward. This would allow the arm to come to rest in plane with the other plates (e.g. to be able to laid flat on a surface). There may also be a gap between the dial and the post that further constrains the arm from lifting out of position as the dial continues to rotate towards its final position. There may also be a feature on the bottom side of the dial that acts as a cam surface in order to guide the each arm as it move.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of".

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for use in cake construction, comprising:
a post including a handle;
a base; and
at least one arm rotatably connected to the post, wherein the at least one arm is rotatable circularly about a longitudinal axis of the post;
wherein the post is positionable at a center of a circle that is coincident with a circular cake such that the at least one arm is rotatable about the post to demarcate a circumference of the circle.

2. The apparatus of claim 1, wherein the at least one arm is rotatable about the post to represent a diameter or a radius of the circle.

3. The apparatus of claim 1, wherein the arms are arranged in a vertical stack.

4. The apparatus of claim 3, wherein a first arm comprises a top and a bottom, the bottom further comprising a front protruding lip and a tab protruding from the front protruding lip to engage a neighboring arm of the vertical stack.

5. The apparatus of claim 4, wherein the neighboring arm further comprises a top and a bottom, the top of the neighboring arm further comprising a recessed groove to engage the tab protruding from the front protruding lip of the first arm.

6. The apparatus of claim 5, wherein the top of the first arm comprises another protruding tab to engage a rear protruding lip of the neighboring arm.

7. The apparatus of claim 1, wherein at least one arm further comprises at least one hole though the at least one arm as a size indicia for use in demarcating a circumference of the circle.

8. The apparatus of claim 1, wherein the at least one arm has a wedge shape, with a point of the wedge proximate the post and a wider edge of the at least arm distal the post.

9. The apparatus of claim 1, wherein the handle is a dial that operably rotates the at least one arm about the post.

10. The apparatus of claim 9, wherein the dial further includes a cover, wherein the cover envelops the post, attaching to a first end of the post and to the base.

11. A cake construction tool, comprising:
a post;
a base;
at least one arm;
wherein said at least one arm is rotatably connected to said post; and
wherein the at least one arm is rotatable relative to the post to demarcate a diameter of a circle for marking a cake.

12. The cake construction tool of claim 11, wherein said at least one arm have at least one measurement indicia.

13. The cake construction tool of claim 11, wherein said at least one arm includes a plurality of arms.

14. The cake construction tool of claim 13, wherein said plurality of arms includes at least four arms.

15. The cake construction tool of claim 13, wherein said plurality of arms include tabs for engaging at least one of another of said plurality of arms such that rotation of at least one of said plurality of arms causes rotation of at least one of another of said plurality of arms.

16. The cake construction tool of claim 11, wherein the cake construction tool further comprises a dial attached to the post.

17. The cake construction tool of claim 16, wherein the dial is turned to rotate said at least one arm about the post.

18. The cake construction tool of claim 16, wherein the dial further comprises a plurality of indentations for gripping.

19. The cake construction tool of claim 11, wherein said at least one arm further comprises a hook for storage.

20. An apparatus for use in cake construction, comprising:
a post comprising: a dial and a base, wherein said post vertically connects the dial and the base;
a plurality of individual arms rotatably connected to the post, wherein the plurality of arms are arranged in a vertical stack whereby the arms are rotatable around the post;
wherein a first individual arm of the plurality of individual arms comprises a top and a bottom, the bottom further comprising a protruding lip to engage a neighboring individual arm of the stack and a tab protruding from said lip;
wherein remaining individual arms of the plurality of individual arms each comprise a top and a bottom, the top further comprising a recessed groove to engage a tab protruding from a lip of a neighboring arm of the stack and a protruding tab shaped to engage a lip of a neighboring arm of the stack, the bottom further comprising a protruding lip capable of engaging a neighboring arm and a tab protruding from the lip;
wherein said post and plurality of individual arms are capable of demarcating a diameter of a circle.

* * * * *